United States Patent
Li et al.

(10) Patent No.: US 10,929,957 B2
(45) Date of Patent: Feb. 23, 2021

(54) DISPLAY METHOD, DISPLAY DEVICE, ELECTRONIC EQUIPMENT, AND STORAGE MEDIUM

(71) Applicant: BOE TECHNOLOGY GROUP CO., LTD., Beijing (CN)

(72) Inventors: Xianzhen Li, Beijing (CN); Lihua Geng, Beijing (CN); Tianyue Zhao, Beijing (CN); Enhui Guan, Beijing (CN); Zhichao Li, Beijing (CN); Xitong Ma, Beijing (CN); Wei Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/665,108

(22) Filed: Oct. 28, 2019

(65) Prior Publication Data
US 2020/0311879 A1 Oct. 1, 2020

(30) Foreign Application Priority Data
Mar. 27, 2019 (CN) .......................... 201910238917.8

(51) Int. Cl.
*H04N 13/122* (2018.01)
*G06T 5/00* (2006.01)
(Continued)

(52) U.S. Cl.
CPC .......... *G06T 5/002* (2013.01); *G06K 9/00335* (2013.01); *G06T 5/20* (2013.01);
(Continued)

(58) Field of Classification Search
None
See application file for complete search history.

(56) References Cited

U.S. PATENT DOCUMENTS

2008/0117323 A1* 5/2008 Sakamoto ................ G09G 5/00
348/333.01
2011/0063421 A1* 3/2011 Kubota ................ H04N 13/398
348/52
(Continued)

FOREIGN PATENT DOCUMENTS

CN 1703915 A 11/2005
CN 103392343 A 11/2013
(Continued)

OTHER PUBLICATIONS

Chinese Office Action in Chinese Application No. 201910238917.8, dated May 29, 2020 with English translation.

*Primary Examiner* — Said Broome
(74) *Attorney, Agent, or Firm* — Collard & Roe, P.C.

(57) ABSTRACT

A display method, a display device, an electronic equipment, and a computer readable storage medium are disclosed. The display method is suitable for a display device, and the display device is configured to display in a first display mode and in a second display mode. The display method includes: obtaining user image information; determining whether a user is currently in a fatigue state based on the user image information; and switching the display device from the second display mode to the first display mode and allowing the display device to display in the first display mode if the user is currently in the fatigue state. The first display mode is different from the second display mode.

19 Claims, 6 Drawing Sheets

(51) Int. Cl.
  *G06K 9/00* (2006.01)
  *G06T 7/194* (2017.01)
  *G06T 5/20* (2006.01)
  *H04N 13/383* (2018.01)
  *H04N 13/15* (2018.01)
  *H04N 13/359* (2018.01)

(52) U.S. Cl.
  CPC ........... *G06T 7/194* (2017.01); *H04N 13/122* (2018.05); *H04N 13/15* (2018.05); *H04N 13/359* (2018.05); *H04N 13/383* (2018.05); *G06T 2207/10012* (2013.01); *G06T 2207/20192* (2013.01)

(56) References Cited

U.S. PATENT DOCUMENTS

| | | | |
|---|---|---|---|
| 2011/0292045 A1* | 12/2011 | Nakamura | H04N 13/239 345/419 |
| 2013/0169543 A1 | 7/2013 | Xia | |
| 2015/0173846 A1* | 6/2015 | Schneider | G02B 27/0101 600/424 |

FOREIGN PATENT DOCUMENTS

| | | | |
|---|---|---|---|
| CN | 103426275 A | 12/2013 |
| CN | 104361716 A | 2/2015 |
| KR | 10-2006-0131015 A | 12/2006 |
| KR | 10-2013-0053296 A | 5/2013 |

\* cited by examiner

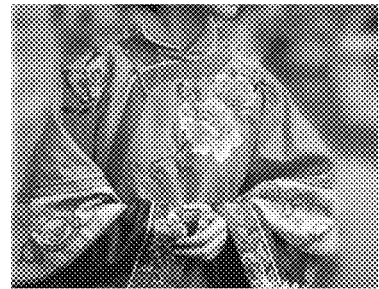

FIG. 3B

S210 — extracting a foreground image from the unprocessed original display image by using a matting algorithm S220 — constructing an image mask according to the foreground image S230 — performing Gaussian filtering on the image mask to obtain an image mask with edge transition S240 — uniformly blurring the original display image to obtain a blurred display image S250 — merging the foreground image in the original display image and the background image in the blurred display image to obtain a display image of which the background image is uniformly blurred

FIG. 4

DISPLAY METHOD, DISPLAY DEVICE, ELECTRONIC EQUIPMENT, AND STORAGE MEDIUM

CROSS-REFERENCE TO RELATED APPLICATION

The application claims priority to Chinese patent application No. 201910238917.8, filed on Mar. 27, 2019, the entire disclosure of which is incorporated herein by reference as part of the present application.

TECHNICAL FIELD

Embodiments of the present disclosure relate to a display method, a display device, an electronic equipment, and a storage medium.

BACKGROUND

The principle of three-dimensional (3D) display is usually that the right eye can only see an image that the right eye needs to see, the left eye can only see an image that the left eye needs to see, and then the image seen by the left eye and the image seen by the right eye are merged through the visual center, so that a visual effect of a three-dimensional image is formed.

SUMMARY

At least an embodiment of the present disclosure provides a display method, and the display method is suitable for a display device. The display device is configured to display in a first display mode and in a second display mode, and the display method includes: obtaining user image information; determining whether a user is currently in a fatigue state based on the user image information; and switching the display device from the second display mode to the first display mode and allowing the display device to display in the first display mode if the user is currently in the fatigue state. The first display mode is different from the second display mode.

For example, in the display method provided by some embodiments of the present disclosure, obtaining the user image information includes: collecting image data comprising the user image information; and extracting the user image information from the image data.

For example, in the display method provided by some embodiments of the present disclosure, subsequent to switching the display device from the second display mode to the first display mode and allowing the display device to display in the first display mode, the display method further includes: performing visual processing on a display image in the first display mode; and allowing the display device to display a visually processed display image.

For example, in the display method provided by some embodiments of the present disclosure, performing visual processing on the display image in the first display mode includes: blurring a background image in the display image to obtain a display image of which the background image is blurred; and allowing the display device to display the visually processed display image includes: allowing the display device to display the display image of which the background image is blurred.

For example, in the display method provided by some embodiments of the present disclosure, blurring the background image in the display image includes at least one of: uniformly blurring the background image, and progressively blurring the background image.

For example, in the display method provided by some embodiments of the present disclosure, blurring the background image in the display image further includes: extracting the background image from the display image; and extracting the background image from the display image includes: extracting a foreground image from the display image by using a matting algorithm; constructing an image mask according to the foreground image; performing Gaussian filtering on the image mask to obtain an image mask with edge transition; and extracting the background image from the display image by using the image mask with edge transition.

For example, in the display method provided by some embodiments of the present disclosure, progressively blurring the background image includes: constructing a proportionality coefficient centering on a center point of the foreground image in the display image, calculating a diffusion coefficient according to the proportionality coefficient, and performing variable radius Gaussian blurring on the background image according to the diffusion coefficient; and variation of the diffusion coefficient is that the further away from the center point of the foreground image in the display image, the greater the diffusion coefficient, the greater a blurring degree of the background image.

For example, in the display method provided by some embodiments of the present disclosure, performing visual processing on the display image in the first display mode includes: enhancing the foreground image in the display image.

For example, in the display method provided by some embodiments of the present disclosure, enhancing the foreground image in the display image includes: performing advancing color processing on the foreground image in the display image.

For example, in the display method provided by some embodiments of the present disclosure, determining whether the user is currently in the fatigue state based on the user image information includes: calculating, based on the user image information, a blink frequency of the user in a predetermined time interval, a pupil distance of the user, and length of time when the user gazes at the display image; and determining whether the user is currently in the fatigue state based on the blink frequency of the user in the predetermined time interval, the pupil distance of the user, and the length of time when the user gazes at the display image.

For example, the display method provided by some embodiments of the present disclosure further includes: switching the display device from the first display mode to the second display mode and allowing the display device to display in the second display mode if the user currently changes from the fatigue state to a non-fatigue state.

For example, the display method provided by some embodiments of the present disclosure further includes: determining whether a current display mode of the display device is the second display mode; and switching the display device from the second display mode to the first display mode and allowing the display device to display in the first display mode if the user is currently in the fatigue state includes: switching the display device from the second display mode to the first display mode and allowing the display device to display in the first display mode if the user is currently in the fatigue state and the current display mode is the second display mode.

For example, in the display method provided by some embodiments of the present disclosure, the first display mode is a two-dimensional display mode, and the second display mode is a three-dimensional display mode.

At least an embodiment of the present disclosure further provides a display device, and the display device includes an image sensor, a controller, and a display panel. The image sensor is on a side, facing a user, of the display device, and is configured to collect image data comprising user image information; the controller is configured to extract the user image information from the image data, determine whether the user is currently in a fatigue state based on the user image information, and send a first display mode switching instruction to the display panel if the user is currently in the fatigue state; and the display panel is configured to display in a plurality of display modes, and the plurality of display modes include a first display mode.

For example, in the display device provided by some embodiments of the present disclosure, the controller is configured to blur a background image in a display image in the first display mode to obtain a display image of which the background image is blurred; and the display panel is configured to display the display image of which the background image is blurred.

For example, in the display device provided by some embodiments of the present disclosure, the controller is configured to enhance a foreground image in a display image in the first display mode to obtain a display image of which the foreground image is enhanced; and the display panel is configured to display the display image of which the foreground image is enhanced.

For example, in the display device provided by some embodiments of the present disclosure, the controller is configured to: calculate, based on the user image information, a blink frequency of the user in a predetermined time interval, a pupil distance of the user, and length of time when the user gazes at the display device; and determine whether the user is currently in the fatigue state based on the blink frequency of the user in the predetermined time interval, the pupil distance of the user, and the length of time when the user gazes at the display device.

For example, in the display device provided by some embodiments of the present disclosure, the plurality of display modes further include a second display mode, and the second display mode is different from the first display mode; and the controller is further configured to send a second display mode switching instruction to the display panel if the user currently changes from the fatigue state to a non-fatigue state.

For example, in the display device provided by some embodiments of the present disclosure, the first display mode is a two-dimensional display mode, and the second display mode is a three-dimensional display mode; and the first display mode switching instruction is an instruction to switch the display device from the three-dimensional display mode to the two-dimensional display mode, and the second display mode switching instruction is an instruction to switch the display device from the two-dimensional display mode to the three-dimensional display mode.

At least an embodiment of the present disclosure further provides an electronic equipment, and the electronic equipment includes at least one processor, and a memory in communication connection to the at least one processor; and the memory stores instructions executable by the at least one processor, and the instructions, when executed by the at least one processor, allows the at least one processor to perform the display method provided by any one of the embodiments of the present disclosure.

At least an embodiment of the present disclosure further provides a computer readable storage medium, and the computer readable storage medium stores a computer program; and the computer program, when executed by a processor, implements steps of the display method provided by any one of the embodiments of the present disclosure.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

FIG. 3B is a schematic diagram of the display image, of which a background image is blurred, illustrated in FIG. 3A;

FIG. 4 is a schematic flowchart of a method for blurring a background image provided by some embodiments of the present disclosure;

DETAILED DESCRIPTION

Figure 1A:
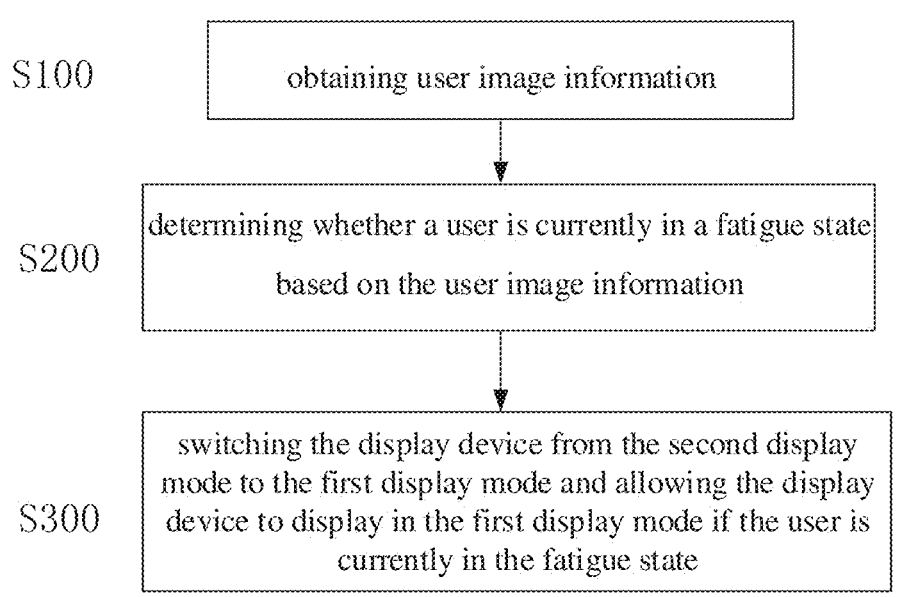
FIG. 1A is a schematic flowchart of a display method provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

When a user watches an image in a 3D display mode, in order to quickly merge images seen by both eyes into an image with a stereoscopic visual effect, the eyes need to move back and forth quickly. However, because people have different eye spacing and eye muscle strength is not balanced, or because images received by both eyes are different in shape and size and both eyes are exposed to strong acousto-optic image stimulation for a long time, it is easy to make eyes uncomfortable. In addition, because the 3D display separates an image seen by the left eye and an image seen by the right eye, the brain is always in a highly stressed state in order to maintain the merging function, so that it is easy to cause the appearance of visual fatigue symptoms, and thus, the user is in a fatigue state while watching the display image, thereby seriously reducing the viewing experience of the user.

At least an embodiment of the present disclosure provides a display method. The display method is suitable for a display device, and the display device is configured to display in a first display mode and in a second display mode. The display method includes: obtaining user image information; determining whether a user is currently in a fatigue state based on the user image information; and switching the display device from the second display mode to the first display mode and allowing the display device to display in the first display mode if the user is currently in the fatigue state. The first display mode is different from the second display mode.

The display method provided by the embodiments of the present disclosure can determine whether the user is in a fatigue state based on the obtained user image information, and switch the display mode of the display device if the user is in the fatigue state. Therefore, the display method can switch the display device to a display mode that is less likely to cause fatigue of the user when the user is in the fatigue state, so that the fatigue state of the user is alleviated, and for example, the visual fatigue of the user can be alleviated to a certain extent, thereby allowing the user to watch the display image more comfortably and improving the viewing experience of the user.

Hereinafter, the display method provided by some embodiments of the present disclosure will be described in detail with reference to the accompanying drawings.

FIG. 1A is a schematic flowchart of a display method provided by some embodiments of the present disclosure.

For example, as illustrated in FIG. 1A, the display method includes the following steps.

The step S100: obtaining user image information.

The step S200: determining whether a user is currently in a fatigue state based on the user image information.

The step S300: switching the display device from the second display mode to the first display mode and allowing the display device to display in the first display mode if the user is currently in the fatigue state. The first display mode is different from the second display mode.

Figure 1B:
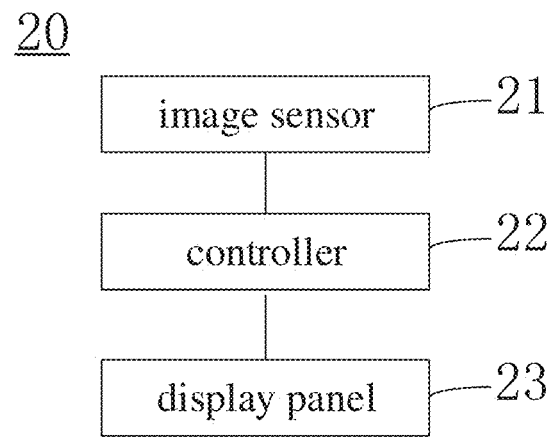
FIG. 1B is a block schematic diagram of a display device provide by some embodiments of the present disclosure.

FIG. 1B is a block schematic diagram of a display device provide by some embodiments of the present disclosure. For example, the display device 20 illustrated in FIG. 1B may implement the display method as illustrated in FIG. 1A.

Hereinafter, the display method illustrated in FIG. 1A will be described with reference to the display device 20 illustrated in FIG. 1B.

For example, as illustrated in FIG. 1B, the display device 20 includes an image sensor 21, a controller 22, and a display panel 23.

For example, the image sensor 21 may be disposed on a side, facing the user, of the display device 20 and used for collecting image data comprising the user image information. For example, the image data collected by the image sensor 21 includes the user image information that needs to be obtained in the step S100, and the user image information can be used in the step S200 to determine whether the user is currently in the fatigue state.

For example, the image sensor 21 can be a high speed camera or other image acquisition device. For example, the image sensor 21 may be a structure or component disposed in a display component of the display device 20, such as a built-in camera in the display component. For example, the image sensor 21 may also be a camera or a surveillance camera that is separately provided and in signal connection to the display component. The embodiments of the present disclosure are not limited in this aspect.

For example, the image data collected by the image sensor 21 may be a photo or a picture comprising an image of the user's face at a certain time, may be a plurality of sets of photos comprising images of the user's face at different times, or may also be a video comprising the image of the user's face and the like. The embodiments of the present disclosure do not limit the specific type of the image data collected by the image sensor 21 as long as the user image information is included in the image data.

For example, the image sensor 21 may collect the image data comprising the user image information according to a preset period. For example, image data may be collected every 1 second or every 1 minute, so that the display device 20 can obtain desired user image information in real time, thereby knowing the viewing state of the user in a timely and effective manner.

For example, the controller 22 may be configured to extract the user image information required in the step S100 from the image data collected by the image sensor 21, and determine whether the user is currently in the fatigue state based on the obtained user image information, that is, perform the step S200. Moreover, if the controller 22 determines that the user is currently in the fatigue state based on the obtained user image information, the controller 22 sends a first display mode switching instruction to the display panel 23 to switch the display mode of the display panel 23, so as to allow the display device 20 to implement the step S300.

For example, the controller 22 may be implemented in various suitable forms, for example, may be constituted by components such as transistors, resistors, capacitors, and amplifiers, or may be implemented by a signal processor such as an FPGA, a DSP, an MCU, or the like. The controller 22 may further include a processor and a memory, and the processor executes software programs stored in the memory to implement corresponding functions described above.

For example, the display panel 23 can be used to display in a plurality of display modes, and the plurality of display modes include the first display mode. For example, where the display panel 23 receives the first display mode switching instruction sent by the controller 22, the display panel 23 is switched to the first display mode and displays in the first display mode, thereby allowing the display device 20 to implement the step S300.

For example, the display panel 23 may be a display component having a display function, and may be, for example, an organic light-emitting diode (OLED) display component, a quantum dot light-emitting diode (QLED) display component, a liquid crystal display (LCD) component, or the like. For example, the display component may have a 3D display function and a 2D display function, and may be switched between a 3D display mode (e.g., the second display mode) and a 2D display mode (e.g., the first display mode), and such display component may be selected from existing designs. For example, one example of the display component includes a display panel and a liquid crystal grating panel disposed on one side of the display panel. The display panel may be a liquid crystal display panel or an OLED display panel, and includes a first sub-pixel array and a second sub-pixel array. The first sub-pixel array may be used to display, for example, the image seen by the left eye in the 3D display mode, and the second sub-pixel array may be used to display, for example, the image seen by the right eye in the 3D display mode. Each sub-pixel column of the first sub-pixel array and each sub-pixel column of the second sub-pixel array are alternately arranged, and the first sub-pixel array and the second sub-pixel array display the same image in the 2D display mode. The liquid crystal grating panel can, for example, generate a grating for implementing the 3D display when an electrical signal is applied, and can be entirely transparent for implementing the 2D display when no electrical signal is applied.

For example, the display device 20 provided by the embodiments of the present disclosure may be any product or component having the display function, such as a liquid crystal panel, a liquid crystal television, an OLED panel, an OLED television, a monitor, an electronic paper display device, a mobile phone, a tablet computer, a notebook computer, a digital photo frame, a navigator, or the like. The embodiments of the present disclosure are not limited in this aspect.

Therefore, the display method provided by the embodiments of the present disclosure can be implemented by such as the display device 20 illustrated in FIG. 1B, so that the visual fatigue of the user can be alleviated to a certain extent, thereby allowing the user to watch the image more comfortably.

Figure 2A:
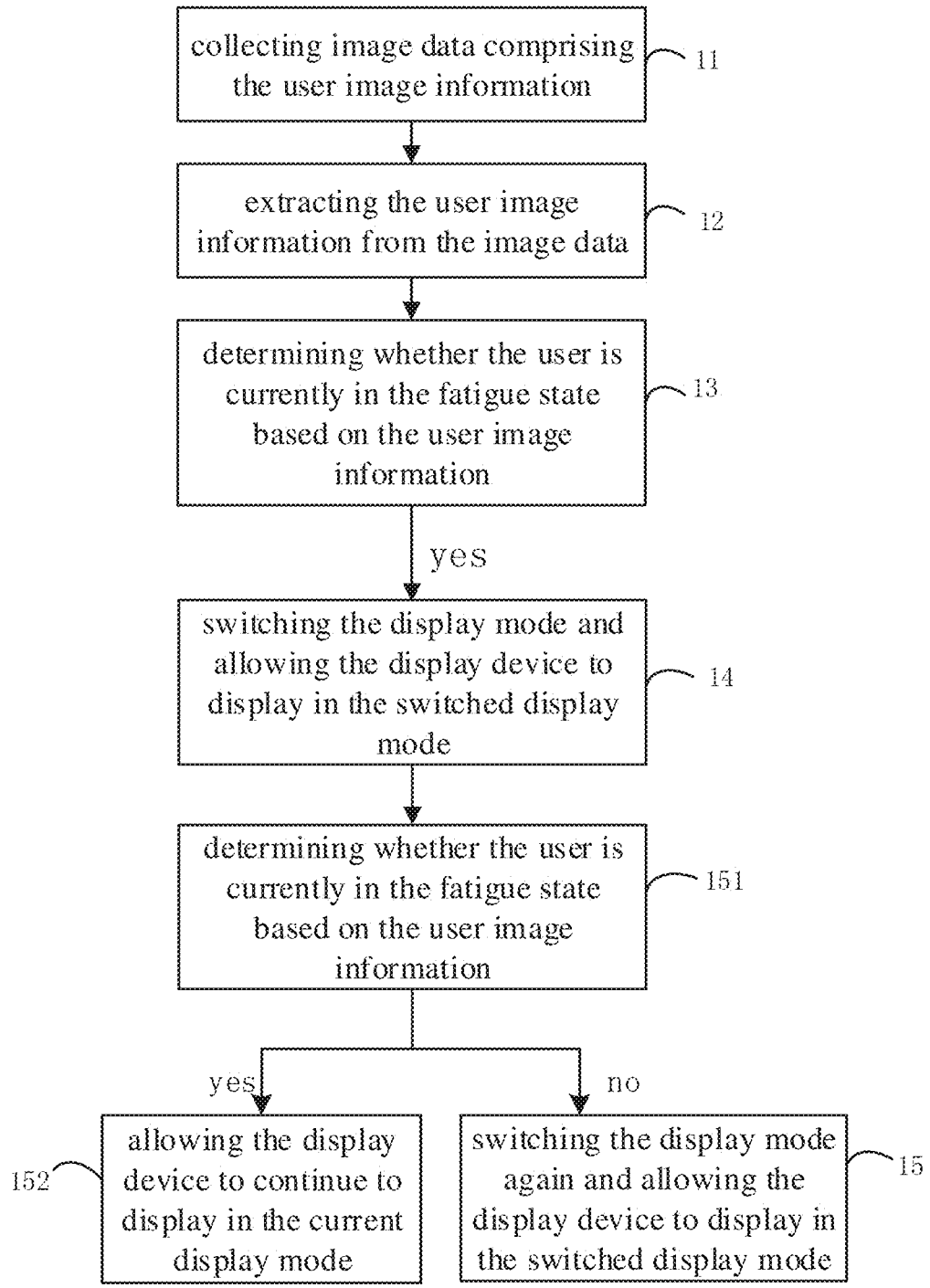
FIG. 2A is a schematic flowchart of another display method provided by some embodiments of the present disclosure.

FIG. 2A is a schematic flowchart of another display method provided by some embodiments of the present disclosure.

For example, as illustrated in FIG. 2A, the display method includes the following steps.

The step 11: collecting image data comprising the user image information.

For example, when collecting the image data, the collected image data needs to comprise the user image information, and the user image information can be used in the subsequent step 13 to determine whether the user is in the fatigue state.

The step 12: extracting the user image information from the image data.

Here, the step of extracting the user image information from the image data may be implemented by using any suitable image processing method, and details are not described herein again.

For example, in some embodiments of the present disclosure, a face image in the image data can be identified and extracted according to facial feature points, thereby obtaining face image information of the user to determine the fatigue state of the user. The embodiments of the present disclosure do not limit the specific method for extracting the user image information.

For example, in some embodiments of the present disclosure, the user image information may also be obtained by other methods. For example, the display device may be in signal connection to other device which monitors the state of the user, so that the image information required for determining the fatigue state of the user is directly obtained by the device. The embodiments of the present disclosure do not limit the specific method for obtaining the user image information.

The step 13: determining whether the user is currently in the fatigue state based on the user image information.

For example, the step 13 may specifically include the following steps.

For example, based on the user image information, a blink frequency of the user in a predetermined time interval, a pupil distance of the user, and length of time when the user gazes at the display device or a display image are calculated.

For example, a specific method for calculating the number of blinks (that is, the blink frequency of the user) herein may be: collecting a plurality of user image information in the predetermined time interval and extracting eye images of the user therefrom. The number of blinks in the predetermined time interval is calculated by analyzing situations in which the user opens and closes the eyes in the eye images. For example, the calculation of the pupil distance herein may be obtained by extracting a binocular image of the user from the user image information and then calculating a distance between the pupils in the binocular image. For example, a specific method for calculating the length of time when the user gazes at the display device or the display image may be: collecting a plurality of user image information in a predetermined time interval, and extracting eye images of the user from the plurality of user image information. If no eye image can be extracted from the user image information, or the extracted eye image indicates that the eyes are in a closed-eye state, it is determined that the user does not look at the display device or the display image at this time, and accordingly the length of time when the user gazes at the display device or the display image is determined. The specific method for determining the length of time when the user gazes at the display device or the display image can be adjusted as needed, and the embodiments of the present disclosure are not limited in this aspect.

For example, in the step 13, it can be determined whether the user is currently in the fatigue state based on the number of blinks in the predetermined time interval, the pupil distance, and the length of time when the user gazes at the display device or the display image.

For example, herein, the fatigue of the user is related to the number of blinks in the predetermined time interval, the change in the pupil distance, and the length of time to gaze at the display device. For example, the number of blinks in the predetermined time interval, the change threshold of the pupil distance, and the threshold of the length of time to gaze at the display device can be set in advance. In a case where at least one of a group consisting of the number of blinks of the user in the predetermined time interval, the pupil distance of the user, and the length of time when the user gazes at the display device or the display image, which are obtained from the user image information, exceeds a reasonable threshold range, it is determined that the user is already in the fatigue state. The specific reasonable threshold range can be set according to practical requirements, and is not specifically limited herein.

In this way, based on the number of blinks of the user in the predetermined time interval, the pupil distance of the user, and the length of time when the user gazes at the display device or the display image, it can be objectively determined whether the user is currently in the fatigue state, thereby reflecting a more realistic state of the user.

For example, in some embodiments of the present disclosure, it is also possible to determine whether the user is currently in the fatigue state based on, for example, the facial expression of the user or the like in the obtained user image information. The method for determining the fatigue state of the user is not limited in the embodiments of the present disclosure.

For example, in some embodiments of the present disclosure, in a case where the obtained user image information includes the image information of a plurality of users, the fatigue states of the plurality of users may be separately determined based on the obtained image information. For example, in a case where the number of users in the fatigue state is greater than the number of users in the non-fatigue state, the subsequent steps are performed according to a case that the users are currently in the fatigue state.

The step 14: switching the display mode and allowing the display device to display in the switched display mode if the user is currently in the fatigue state, for example, switching the display device from the second display mode to the first display mode and allowing the display device to display in the first display mode.

For example, the first display mode may be, for example, a display mode in which visual fatigue of the user can be reduced, and the second display mode may be, for example, a normal display mode. Therefore, when the normal display mode of the display device is switched to the display mode in which visual fatigue of the user can be reduced in the step 14, the visual fatigue state of the user can be alleviated, thereby improving the comfort of the user when watching the display image and improving the viewing experience of the user. For example, the first display mode may also be a display mode in which the brightness is reduced, a display mode in which the blue light output is reduced, or other display modes in which visual fatigue is less likely to occur, and the embodiments of the present disclosure are not limited in this aspect.

The step 151: determining whether the user is currently in the fatigue state based on the user image information.

The step 152: allowing the display device to continue to display in the current display mode if the user is currently in the fatigue state.

The step 15: if the user is currently in a non-fatigue state, for example, if the user changes (for example, recovers) from the fatigue state to the non-fatigue state, that is, the fatigue state of the user is alleviated, switching the display mode again and allowing the display device to display in the switched display mode, for example, switching the display device from the first display mode to the second display mode again and allowing the display device to display in the second display mode.

For example, the first display mode is a display mode in which visual fatigue of the user is alleviated, and the second display mode is a normal display mode. Therefore, when monitoring that the visual fatigue state of the user is alleviated, the display device is switched from the previous display mode (i.e., the first display mode) for reducing visual fatigue to the normal display mode (i.e., the second display mode), thereby restoring the viewing experience of the user. In combination with the embodiments described above, the embodiments of the present disclosure switch the display device between two different display modes according to the fatigue state of the user, which satisfies the physiological state of the user, thereby alleviating the visual fatigue state of the user to a certain extent and further improving the viewing experience of the user.

For example, the first display mode may be a two-dimensional display mode, and the second display mode may be a three-dimensional display mode. Switching the display mode means switching the display device between the three-dimensional display mode and the two-dimensional display mode. Specifically, when it is detected that the user is in the fatigue state, the display device is switched from the three-dimensional display mode to the two-dimensional display mode; and when it is detected that the user recovers from the fatigue state to the non-fatigue state, the display device is switched from the two-dimensional display mode to the three-dimensional display mode.

Certainly, in addition to switching between the three-dimensional display mode and the two-dimensional display mode, the display mode of the display device may also be switched between the normal display mode and other display modes which are less likely to cause fatigue, for example, a display mode in which the display brightness is reduced, a display mode in which the blue light output is reduced, or the like, and all these alternatives can be used as the embodiments of the present disclosure.

For example, the second display mode may be a normal display mode, and the first display mode may be a display mode in which the brightness is reduced, a display mode in which the blue light output is reduced, or other display modes in which fatigue feeling is less likely to occur. The embodiments of the present disclosure are not limited in this aspect.

Figure 2B:
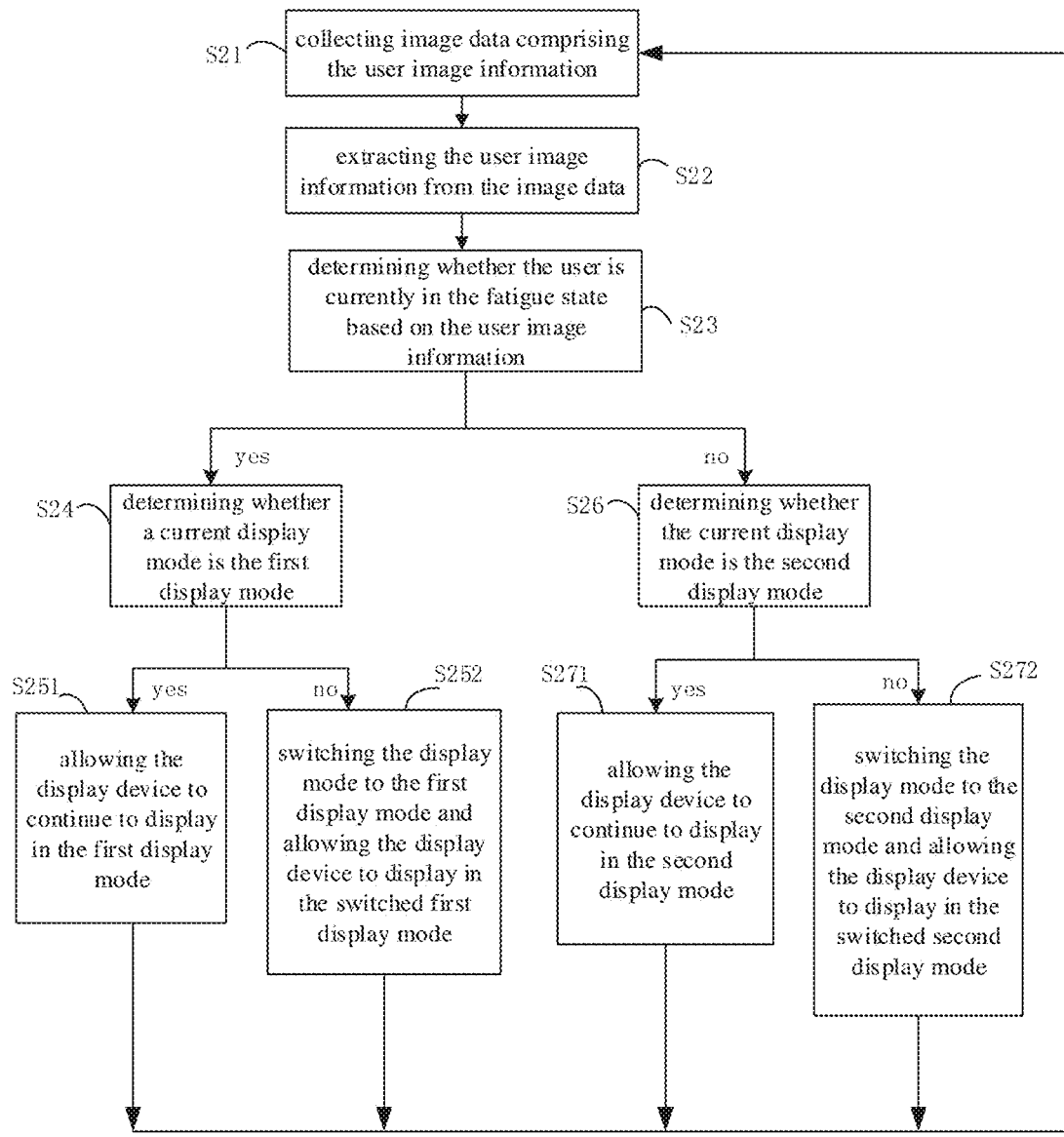
FIG. 2B is a schematic flowchart of further still another display method provided by some embodiments of the present disclosure.

FIG. 2B is a schematic flowchart of further still another display method provided by some embodiments of the present disclosure. It should be noted that steps S21 to S23 in the display method illustrated in FIG. 2B are substantially the same as steps 11 to 13 in the display method illustrated in FIG. 2A, and details are not described herein again.

For example, as illustrated in FIG. 2B, subsequent to performing the step S23, if it is determined that the user is currently in the fatigue state, the display method further includes the following steps.

The step S24: determining whether a current display mode is the first display mode. For example, the first display mode is a display mode in which visual fatigue of the user is alleviated.

The step S251: allowing the display device to continue to display in the first display mode if the current display mode is the first display mode.

The step S252: switching the display mode to the first display mode and allowing the display device to display in the switched first display mode if the current display mode is not the first display mode.

For example, as illustrated in FIG. 2B, after performing the step S23, if it is determined that the user is currently in the non-fatigue state, the display method further includes the following steps.

The step S26: determining whether the current display mode is the second display mode. For example, the second display mode is the normal display mode.

The step S271: allowing the display device to continue to display in the second display mode if the current display mode is the second display mode.

The step S272: switching the display mode to the second display mode and allowing the display device to display in the switched second display mode if the current display mode is not the second display mode.

For example, as illustrated in FIG. 2B, subsequent to performing the step S251, S252, S271, or S272, the method returns to perform the step S21. Thereby, the display mode of the image can be effectively controlled in real time by the display method illustrated in FIG. 2B.

As can be seen from the embodiments illustrated in FIG. 1A, FIG. 2A, and FIG. 2B, the display method provided by the embodiments of the present disclosure obtains the required user image information by collecting the image data comprising the user image information, and determines whether the user is in the fatigue state based on the obtained user image information; and switches the display mode if the user is in a fatigue state. Therefore, when the user is in the fatigue state, the display device is switched to a display mode that is less likely to cause fatigue of the user, thereby allowing the user to watch the image more comfortably and improving the viewing experience of the user.

For example, in some embodiments of the present disclosure, where the display device is switched to the first display mode, the display method further includes: performing visual processing on a display image in the first display mode, and allowing the display device to display a visually processed display image.

For example, where the display mode is switched to the first display mode that is not easy to cause fatigue of the user, the display image in the first display mode may be performed visual processing to improve the image display effect in the first display mode, for example, to improve the stereoscopic effect or contrast of the display image, thereby improving the image display effect in the first display mode and reducing or avoiding the bad influence of the display mode switching on the viewing experience of the user.

For example, in some embodiments of the present disclosure, a background image in the display image may be blurred to obtain a display image of which the background image is blurred, and the display image, of which the background image is blurred, is displayed. Thereby, a foreground image in the display image can be clearer and more prominent, and the stereoscopic effect of the display image in the first display mode can be improved, thereby improving the image display effect in the first display mode, and reducing or avoiding the bad influence of the display mode switching on the viewing experience of the user.

For example, in some embodiments of the present disclosure, the background image in the display image may be uniformly blurred; or, in some embodiments of the present disclosure, the background image in the display image may also be progressively blurred. Alternatively, in some embodiments of the present disclosure, the background image in the display image may first be uniformly blurred and then be progressively blurred. The embodiments of the present disclosure do not limit the method for blurring the background image.

Hereinafter, by taking a case where the first display mode is the two-dimensional display mode and the second display mode is the three-dimensional display mode as an example, the method for blurring the background image in the display image in the first display mode will be described in detail.

Figure 3A:
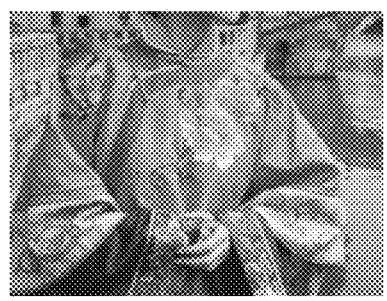
FIG. 3A is a schematic diagram of an unprocessed display image in some embodiments of the present disclosure.

For example, referring to FIG. 3A and FIG. 3B, the background image in the display image can be uniformly blurred to obtain a display image of which the background image is uniformly blurred.

In this way, by uniformly blurring the background image, the foreground image is clearer and more prominent, thereby increasing the stereoscopic effect of the display image in the two-dimensional display mode and improving the visual effect of the display image in the two-dimensional display mode, so that when the three-dimensional display mode is switched to the two-dimensional display mode, the sense of difference of the user is reduced, thereby improving the viewing experience of the user.

For example, in some embodiments of the present disclosure, the background image in the display image illustrated in FIG. 3B may be further progressively blurred to further increase the stereoscopic effect of the display image in the two-dimensional display mode. Alternatively, in some embodiments of the present disclosure, the background image in the display image illustrated in FIG. 3A can also be directly progressively blurred, and the embodiments of the present disclosure are not limited in this aspect.

For example, in a case where the background image in the display image is blurred, the blurred background image may be merged with the non-blurred foreground image to obtain the display image of which the background image is blurred.

Hereinafter, by taking the display image illustrated in FIG. 3A as an example, the method for obtaining a display image of which the background image is uniformly blurred, and the method for obtaining a display image of which the background image is progressively blurred, will be described. It should be noted that the two methods in the following are exemplary descriptions, and the embodiments of the present disclosure do not limit the manner and specific method for blurring the background image in the display image.

For example, as illustrated in FIG. 4, in a case where the background image in the display image illustrated in FIG. 3A is uniformly blurred, the following steps may be included.

The step S210: extracting a foreground image from the unprocessed original display image by using a matting algorithm.

For example, the foreground image in the display image illustrated in FIG. 3A may be a character image. For example, the matting algorithm used may be a Bayes matting algorithm, a graph cut, an Alpha matting algorithm, a matting algorithm related to deep learning, or the like, and the embodiments of the present disclosure are not limited in this aspect.

The step S220: constructing an image mask according to the foreground image, that is, constructing a focal plane.

For example, in the image mask constructed according to the foreground image in the display image illustrated in FIG. 3A, the foreground image corresponds to a white area in the image mask, and the background image corresponds to a black area in the image mask, so that an area value matrix IMASK, consisting of 0 and 1, of the image mask is obtained.

The step S230: performing Gaussian filtering on the image mask to obtain an image mask with edge transition.

Therefore, in the display image, of which the background image is blurred, obtained in the subsequent process, a transition region of the background image and the foreground image can be more natural, and for example, a transition edge may be smoother, thereby improving the image display effect in the first display mode and improving the viewing experience of the user.

The step S240: uniformly blurring the original display image to obtain a blurred display image.

For example, the original display image may be uniformly blurred according to the desired blurring degree, and for example, the uniformly blurring method can be a Gaussian blurring method.

The step S250: merging the foreground image in the original display image and the background image in the blurred display image to obtain a display image of which the background image is uniformly blurred.

For example, the foreground image in the original display image and the background image in the blurred display image may be merged according to the formula P=S*IMASK+(255−IMASK)*G For example, S is the original display image, G is the blurred display image, P is the display image of which the background image is blurred, and IMASK is the area value matrix of the image mask.

For example, when progressively blurring the background image in the display image illustrated in FIG. 3A, based on the above steps S210 to S230, the step of the progressively blurring method further includes: constructing a proportionality coefficient centering on a center point of the foreground image in the display image, calculating a diffusion coefficient according to the proportionality coefficient, and progressively blurring the background image according to the diffusion coefficient. The variation of the diffusion coefficient is: the further away from the center point of the foreground image in the display image, the greater the diffusion coefficient, the greater a blurring degree of the background image, that is, the more blurry the corresponding background image.

For example, the foreground image in the display image illustrated in FIG. 3A is a character image, and a center point of the character image can be calculated according to a centroid calculation formula after extracting the foreground image by using the matting algorithm. The calculation method can use a conventional algorithm, and details are not described herein again.

For example, in a case of progressively blurring the background image, a variable radius Gaussian blurring method can be used, and the diffusion coefficient is the Gaussian radius.

For example, in some embodiments of the present disclosure, the background image in the display image such as illustrated in FIG. 3A can be first uniformly blurred (e.g., performed Gaussian blurring) and then progressively blurred (e.g., performed variable radius Gaussian blurring). Therefore, by uniformly blurring the background image and then progressively blurring the background image, the blurring degree of the background image has a gradual effect, so that the stereoscopic effect of the image can be further increased and the visual effect of the display image in the first display mode can be ameliorated, thereby reducing or avoiding the bad influence of the display mode switching on the viewing experience of the user and improving the user experience.

For example, in some embodiments of the present disclosure, the foreground image in the display image may be enhanced to obtain a display image of which the foreground image is enhanced, and the display image, of which the foreground image is enhanced, is displayed. Thereby, the foreground image in the display image can be clearer and more prominent, and the visual effect, such as the stereoscopic effect or contrast, of the display image in the first display mode can be improved, thereby improving the image display effect in the first display mode, and reducing or avoiding the bad influence of the display mode switching on the viewing experience of the user.

For example, enhancing the foreground image in the display image may include performing advancing color processing on the foreground image in the display image.

Among various colors, some colors appear convex, and some colors appear concave. The color that appears convex is referred to as the advancing color, and the color that appears concave is referred to as the receding color. The advancing color includes, for example, warm colors such as red, orange, and yellow, and is mainly the high saturation color, and the receding color includes, for example, cold colors such as blue and blue purple, and is mainly the low saturation color.

For example, among various colors placed on the same plane, the advancing color is any one of certain colors (such as various yellows and other colors similar to yellow) which appear closer to the eyes than other colors. Among various colors placed on the same plane, the receding color is one of several colors (such as green, blue, purple, and other similar colors) which appear further away from the eyes.

Because in the same visual standard, different colors may have different senses of distance. For example, the long-wavelength color looks close, and the short-wavelength color looks far. Therefore, by using the advancing color and the receding color to process the image, the display image is visually rendered to have a stereoscopic effect, thereby improving the visual effect of the display image. The principle is that when the eyes observe colors with different wavelengths at the same distance, the warm color with a long wavelength forms an inner image on the retina, and the cold color with a short wavelength forms an outer image on the retina. Therefore, by using this principle, the useful information or key part (for example, the foreground image) in the display image can be enhanced, thereby allowing the contrast of the display image to be higher, and allowing the stereoscopic effect of the display image to be stronger. The more commonly used algorithms comprise the histogram equalization algorithm, homomorphism, etc.

Therefore, in some other embodiments of the present disclosure, where the display device is switched from the second display mode to the first display mode, the display method further includes: enhancing the foreground image in the display image, for example, performing advancing color processing on the foreground image in the display image.

Figure 5A:
FIG. 5A is a schematic diagram of another unprocessed display image in some embodiments of the present disclosure.
Figure 5B:
FIG. 5B is a schematic diagram of the display image illustrated in FIG. 5A after advancing color processing.

For example, as illustrated in FIG. 5A and FIG. 5B, after performing advancing color processing on the foreground image in the display image (with reference to FIG. 5A), the display image (with reference to FIG. 5B), of which the foreground image is processed by the advancing color processing method, can be obtained.

Thus, by performing advancing color processing on the foreground image, the visual effect of the display image in the first display mode can be improved as well. For example, in a case where the first display mode is the two-dimensional display mode and the second display mode is the three-dimensional display mode, enhancing the foreground image may increase the stereoscopic effect of the two-dimensional display image, so that when the three-dimensional display mode is switched to the two-dimensional display mode, the sense of difference of the user is reduced, thereby improving the viewing experience of the user.

For example, in some embodiments of the present disclosure, the display method may further include the step of blurring the background image, and the step of enhancing the foreground image, such as the step of performing advancing color processing on the foreground image, that is, the background image in the display image is blurred and the foreground image in the display image is also enhanced. Therefore, the visual effect of the display image finally obtained is better, and the stereoscopic effect is stronger, thereby improving the viewing effect in the first display mode (for example, the 2D display mode) and ensuring a good viewing experience of the user.

The display mode switching process in the display method provided by the embodiments of the present disclosure is described in the following by taking a visual processing method including blurring the background image in the display image and enhancing the foreground image in the display image as an example.

Figure 6:
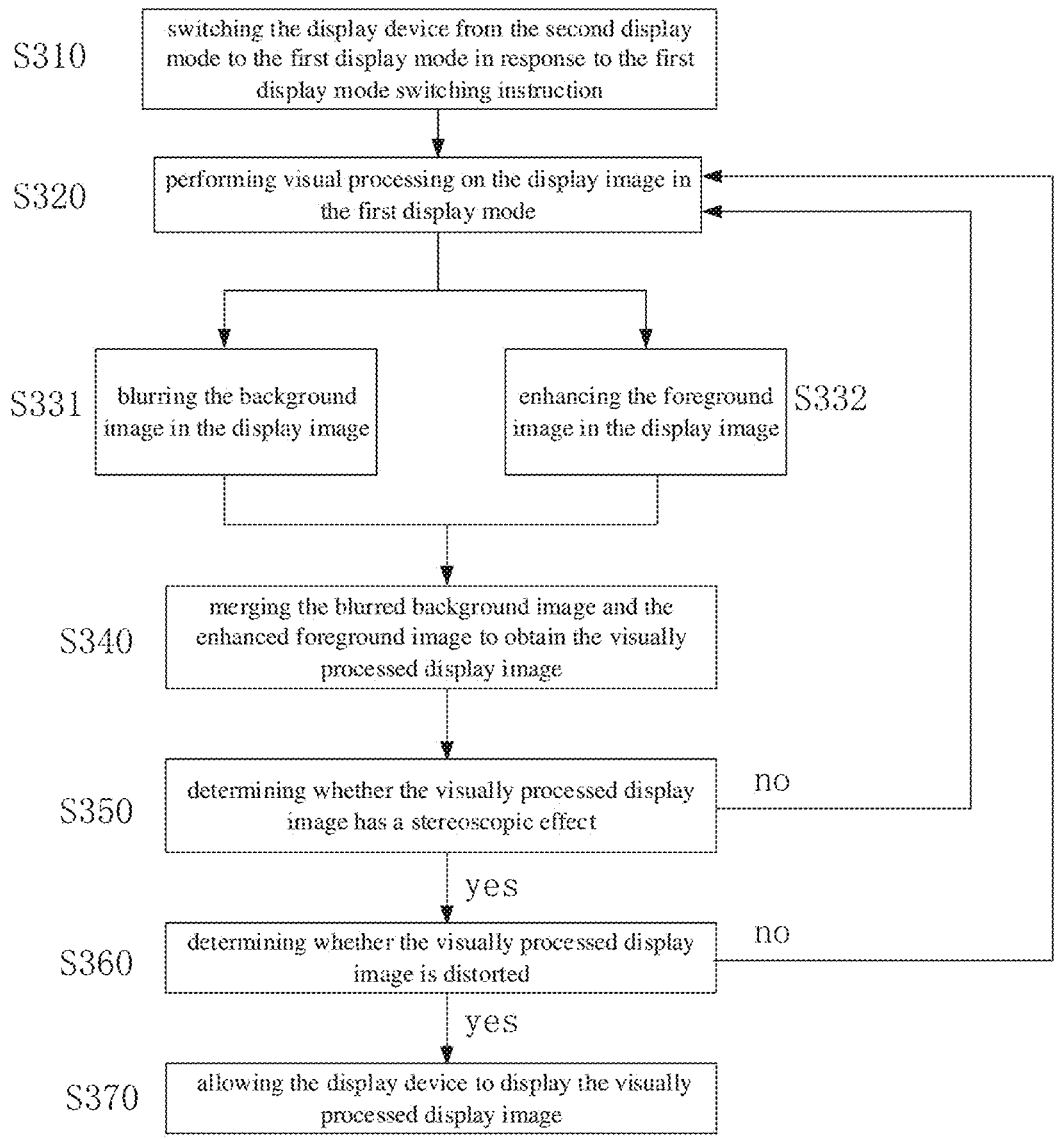
FIG. 6 is a schematic flowchart of a display mode switching method provided by some embodiments of the present disclosure.

FIG. 6 is a schematic flowchart of a display mode switching method provided by some embodiments of the present disclosure. For example, the step S300 in the display method illustrated in FIG. 1A, the step 14 in the display method illustrated in FIG. 2A, or the step S252 in the display method illustrated in FIG. 2B may include the display mode switching process as illustrated in FIG. 6.

For example, as illustrated in FIG. 6, the display mode switching method includes the following steps.

The step S310: switching the display device from the second display mode to the first display mode in response to the first display mode switching instruction.

The step S320: performing visual processing on the display image in the first display mode.

The step S331: blurring the background image in the display image.

The step S332: enhancing the foreground image in the display image.

The step S340: merging the blurred background image and the enhanced foreground image to obtain the visually processed display image.

The step S350: determining whether the visually processed display image has a stereoscopic effect. If the visually processed display image has a stereoscopic effect, the step S360 is performed; and if the visually processed display image does not have a stereoscopic effect, the step S320 is performed.

The step S360: determining whether the visually processed display image is distorted. If the visually processed display image has a distortion effect, the step S370 is performed; and if the visually processed display image does not have a distortion effect, the step S320 is performed.

The step S370: allowing the display device to display the visually processed display image.

At least an embodiment of the present disclosure further provides a display device, and the display device includes an image sensor, a controller, and a display panel. The image sensor is on a side, facing a user, of the display device, and is configured to collect image data comprising user image information. The controller is configured to extract the user image information from the image data, determine whether the user is currently in a fatigue state based on the user image information, and send a first display mode switching instruction to the display panel if the user is currently in the fatigue state. The display panel is configured to display in a plurality of display modes, and the plurality of display modes include a first display mode.

The display device can alleviate the visual fatigue of the user when watching the display device to a certain extent, thereby improving the viewing experience of the user.

For example, the display device can be the display device 20 illustrated in FIG. 1B.

For example, by taking the display device 20 illustrated in FIG. 1B as an example, the controller 22 is specifically configured to: calculate, based on the user image information, a blink frequency of the user in a predetermined time interval, a pupil distance of the user, and length of time when the user gazes at the display device. For example, the specific method for calculating the number of blinks herein may be: collecting a plurality of user image information in the predetermined time interval and extracting eye images of the user therefrom. The number of blinks in the predetermined time interval is calculated by analyzing situations in which the user opens and closes the eyes in the eye images. For example, the calculation of the pupil distance herein may be obtained by extracting a binocular image of the user from the user image information and then calculating the distance between the pupils in the binocular image. For example, a specific method for calculating the length of time when the user gazes at the display device or the display image may be: collecting a plurality of user image information in a predetermined time interval, and extracting eye images of the user from the plurality of user image information. If no eye image can be extracted from the user image information, or the extracted eye image indicates that the eyes are in a closed-eye state, it is determined that the user does not look at the display device or the display image at this time, and accordingly the length of time when the user gazes at the display device or the display image is determined. The specific method for determining the length of time when the user gazes at the display device or the display image can be adjusted as needed, and the embodiments of the present disclosure are not limited in this aspect.

For example, the controller 22 can be configured to determine whether the user is currently in the fatigue state based on the blink frequency of the user in the predetermined time interval, the pupil distance of the user, and the length of time when the user gazes at the display device or the display image. For example, herein, the fatigue of the user is related to the number of blinks in the predetermined time interval, the change in the pupil distance, and the length of time to gaze at the display device. For example, the number of blinks in the predetermined time interval, the change threshold of the pupil distance, and the threshold of the length of time to gaze at the display device can be set in advance. In a case where at least one of a group consisting of the number of blinks of the user in the predetermined time interval, the pupil distance of the user, or the length of time when the user gazes at the display device or the display image, which are obtained from the user image information, exceeds a reasonable threshold range, it is determined that the user is already in the fatigue state. The specific reasonable threshold range can be set according to practical requirements, and is not specifically limited herein.

In this way, based on the number of blinks of the user in the predetermined time interval, the pupil distance of the user, and the length of time when the user gazes at the display device or the display image, it can be objectively determined whether the user is currently in the fatigue state, thereby reflecting a more realistic state of the user.

For example, the display panel 23 is used for displaying in the first display mode.

For example, the first display mode can be a two-dimensional display mode. The first display mode switching instruction may be an instruction to switch other different display modes, such as the three-dimensional display mode, to the two-dimensional display mode. Therefore, in a case where the display panel 23 is in the three-dimensional display mode, when the first display mode switching instruction is received, the three-dimensional display mode is switched to the two-dimensional display mode, so that fatigue, caused by the user watching the three-dimensional display image, of the user can be alleviated to a certain extent, thereby improving the viewing experience of the user.

Certainly, in addition to switching the three-dimensional display mode to the two-dimensional display mode, the display mode may also be switched to other display modes which are less likely to cause fatigue, that is, the first display mode may be one of the other display modes which are less likely to cause fatigue. For example, the first display mode may be a display mode in which the display brightness is reduced, a display mode in which the blue light output is reduced, or the like, and the embodiments of the present disclosure are not limited in this aspect.

It can be seen from the above embodiments that the display device provided by the embodiments of the present disclosure collects the image data comprising the user image information through the image sensor, and can determine whether the user is in the fatigue state based on the obtained user image information. And if the user is in the fatigue state, the display mode is switched. Therefore, the display device provided by the embodiments of the present disclosure can be switched to a display mode that is less likely to cause user fatigue when the user is in the fatigue state, thereby allowing the user to watch the display image more comfortably and improving the viewing experience of the user.

For example, in some embodiments of the present disclosure, the image sensor 21 may be used to continuously collect the image data comprising the user image information in real time.

For example, in some embodiments of the present disclosure, the controller 22 is further configured to extract the user image information from the image data, and determine whether the user is currently still in the fatigue state based on the user image information. If the user currently recovers from the fatigue state to the non-fatigue state, it is indicated that the fatigue state of the user is alleviated, thereby sending the second display mode switching instruction to the display panel 23.

For example, in some embodiments of the present disclosure, the display panel 23 is used to display in the second display mode.

For example, the second display mode can be a three-dimensional display mode. The second display mode switching instruction may be, for example, an instruction to switch the two-dimensional display mode to the three-dimensional display mode. Certainly, it can be known that if the previous mode switching uses a method of reducing the display brightness, reducing the blue light output, or the like, the second display mode switching instruction herein may also be an instruction to restore the display brightness to a normal state, restore the blue light output to a normal state, or the like.

In this way, when monitoring that the visual fatigue state of the user is alleviated, the display device is switched from the previous display mode for reducing visual fatigue to the normal display mode, thereby restoring the viewing experience of the user. In combination with the embodiments described above, the embodiments of the present disclosure switch the display device between two or more display modes according to the fatigue state of the user, thereby allowing the display image provided by the display device to conform the physiological state of the user and improving the viewing experience of the user.

For example, in some embodiments of the present disclosure, the controller 22 is further configured to blur the background image in the display image (referring to FIG. 3A) in a case where the user is in the fatigue state, so as to obtain a display image (referring to FIG. 3B) of which the background image is blurred.

For example, in some embodiments of the present disclosure, the display panel 23 is used to display the display image of which the background image is blurred.

Therefore, by blurring the background image, the foreground image in the display image is clearer and more prominent, thereby increasing the stereoscopic effect of the display image, for example, the two-dimensional display image, in the first display mode, so that when the original normal display mode, for example, the three-dimensional display mode, is switched to the two-dimensional display mode, the sense of difference of the user is reduced.

For example, in some embodiments of the present disclosure, the controller 22 is configured to enhance the foreground image in the display image (referring to FIG. 5A), for example, perform advancing color processing on the foreground image in the display image, to obtain a display image of which the foreground image is enhanced, for example, to obtain a display image (referring to FIG. 5B) of which the foreground image is processed by the advancing color processing method.

For example, in some embodiments of the present disclosure, the display panel 23 is configured to display the display image of which the foreground image is enhanced, such as the display image of which the foreground image is processed by the advancing color processing method.

In this way, by enhancing the foreground image, for example, by performing advancing color processing on the foreground image, it can also increase the stereoscopic effect of the display image (for example, the two-dimensional display image) in the first display mode, so that when the original three-dimensional display mode is switched to the two-dimensional display mode, the sense of difference of the user is reduced, thereby improving the viewing experience of the user.

For example, in some embodiments of the present disclosure, the controller 22 is specifically configured to blur the background image in the display image and enhance (e.g., perform advancing color processing on) the foreground image in the display image, so as to obtain the display image of which the foreground image is enhanced (for example, processed by the advancing color processing method) and the background image is blurred, thereby further improving the visual effect of the display image in the first display mode and improving the viewing experience of the user.

For example, in some embodiments of the present disclosure, the display panel 23 is used for displaying the display image of which the foreground image is enhanced (e.g., processed by the advancing color processing method) and the background image is blurred.

For example, when the 3D display mode is switched to the 2D display mode, the display image usually loses the stereoscopic display effect. However, in the display device provided by the embodiments of the present disclosure, in a case where the 3D display mode is switched to the 2D display mode, that is, in a case of switching to the first display mode, in one aspect, the background image is blurred, and in another aspect, the foreground image is enhanced (e.g., processed by the advancing color processing method), so that the stereoscopic effect of the display image finally obtained is stronger, thereby improving the image display effect in the 2D display mode and ensuring a good viewing experience of the user.

For example, in some embodiments of the present disclosure, the controller 22 is configured to uniformly blur the background image, and/or progressively blur the background image.

For example, when both uniformly blurring and progressively blurring the background image, by first uniformly blurring (e.g., Gaussian blurring) the background image and then progressively blurring (e.g., variable radius Gaussian blurring) the background image, the blurring degree of the background image has a gradual effect, so that the stereoscopic effect of the image can be further increased and the visual effect of the display image can be improved.

For example, in some embodiments of the present disclosure, the controller 22 is configured to extract the foreground image from the display image by using the matting algorithm. For example, the common matting algorithm may include a Bayes matting algorithm, a graph cut, an Alpha matting algorithm, a matting algorithm related to deep learning, or the like.

For example, in some embodiments of the present disclosure, the controller 22 is configured to construct an image mask (IMASK) according to the foreground image, perform Gaussian filtering processing on the image mask to obtain an image mask with edge transition, and extract the background image in the display image by using the image mask with edge transition.

Therefore, by performing Gaussian filtering processing on the image mask when extracting the foreground image, the obtained image mask can have the edge transition, thereby allowing the subsequent blurring of the image to have a smoother transition, so that in the display image, of which the background image is blurred, obtained in the subsequent process, a transition region of the background image and the foreground image can be more natural, and for example, a transition edge may be smoother.

For example, in some embodiments of the present disclosure, the controller 22 is configured to: construct a proportionality coefficient centering on a center point of the foreground image in the display image, calculate a diffusion coefficient according to the proportionality coefficient, and progressively blur the background image according to the diffusion coefficient, such as perform variable radius Gaussian blurring on the background image. For example, the variation of the diffusion coefficient is that the further away from the center point of the foreground image, the greater the diffusion coefficient, and the greater a corresponding blurring degree of the background image.

For example, the controller in the display device provided by the embodiments of the present disclosure may be implemented in various suitable forms, for example, may be constituted by components such as transistors, resistors, capacitors, and amplifiers, or may be implemented by a signal processor such as an FPGA, a DSP, an MCU, or the like. The controller may further include a processor and a memory, and the processor executes software programs stored in the memory to implement corresponding functions described above.

For example, the display panel in the display device provided by the embodiments of the present disclosure may be a display component having a display function, and may be, for example, an organic light-emitting diode (OLED) display component, a quantum dot light-emitting diode (QLED) display component, a liquid crystal display (LCD) component, or the like. For example, the display component may have a 3D display function and a 2D display function, and may be switched between a 3D display mode (e.g., the second display mode) and a 2D display mode (e.g., the first display mode), and such display component may be selected from existing designs. For example, one example of the display component includes a display panel and a liquid crystal grating panel disposed on one side of the display panel. The display panel may be a liquid crystal display panel or an OLED display panel, and includes a first sub-pixel array and a second sub-pixel array. The first sub-pixel array may be used to display, for example, the image seen by the left eye in the 3D display mode, and the second sub-pixel array may be used to display, for example, the image seen by the right eye in the 3D display mode. Each sub-pixel column of the first sub-pixel array and each sub-pixel column of the second sub-pixel array are alternately arranged, and the first sub-pixel array and the second sub-pixel array display the same image in the 2D display mode. The liquid crystal grating panel can, for example, generate a grating for implementing the 3D display when an electrical signal is applied to the liquid crystal grating panel, and can be entirely transparent for implementing the 2D display when no electrical signal is applied to the liquid crystal grating panel.

For example, the display device provided by the embodiments of the present disclosure may be any product or component having the display function, such as a liquid crystal panel, a liquid crystal television, an OLED panel, an OLED television, a monitor, an electronic paper display device, a mobile phone, a tablet computer, a notebook computer, a digital photo frame, a navigator, or the like. The embodiments of the present disclosure are not limited in this aspect.

Based on the above objective, an embodiment of the present disclosure further provides an electronic equipment that performs the display method according to any one of the embodiments of the present disclosure.

Figure 7:
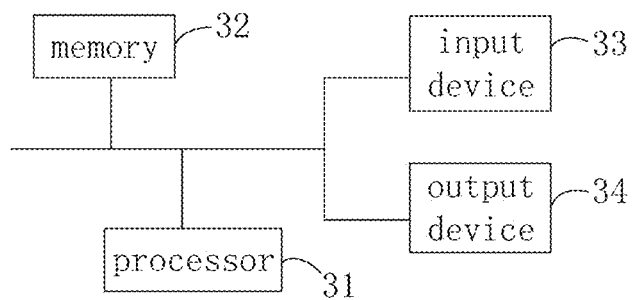
FIG. 7 is a structural schematic diagram of an electronic equipment for performing a display method provided by some embodiments of the present disclosure.

FIG. 7 is a structural schematic diagram of an electronic equipment for performing a display method provided by some embodiments of the present disclosure.

For example, as illustrated in FIG. 7, the electronic equipment includes one or more processors 31, and a memory 32.

For example, one processor 31 is taken as an example in FIG. 7.

For example, the electronic equipment that performs the display method provided by the embodiments of the present disclosure may further include: an input device 33 and an output device 34.

For example, the processor 31, the memory 32, the input device 33, and the output device 34 may be connected through a bus or other means, and connection through the bus is taken as an example in FIG. 7.

For example, the memory 32 is a non-volatile computer readable storage medium and can be used to store non-volatile software programs, and non-volatile computer executable programs and modules. The processor 31 implements various function applications and data processing of the server by executing non-volatile software programs, instructions, and modules stored in the memory 32, that is, implements the display method in the above embodiments of the present disclosure.

For example, the memory 32 can include any combination of one or more computer program products, and the computer program products can include various forms of computer readable storage mediums, such as volatile memories and/or non-volatile memories. The volatile memory may include, for example, a random access memory (RAM)

and/or a cache, or the like. The non-volatile memory may include, for example, a read only memory (ROM), a hard disk, an erasable programmable read only memory (EPROM), a portable compact disc read only memory (CD-ROM), a USB memory, a flash memory, or the like.

For example, the processor 31 can control other components in the image processing device to perform the desired functions. The processor 31 may be a component having data processing capabilities and/or program executing capabilities, such as a central processing unit (CPU), a tensor processing unit (TPU), or a graphics processing unit (GPU). The central processing unit (CPU) can be an X86 or ARM architecture or the like. The GPU can be directly integrated on the mainboard or built in the Northbridge of the mainboard. The GPU can also be built in the central processing unit (CPU).

For example, the memory 32 may include a storage program area and a storage data area, the storage program area may store an operating system, applications required for at least one function, and the storage data area may store data created according to usage of the display device. Moreover, the memory 32 may include a high speed random access memory, and may also include a non-volatile memory, such as at least one magnetic disk storage component, a flash memory component, or other non-volatile solid state memory component. In some embodiments, the memory 32 may optionally include the storage remotely located relative to the processor 31, and these remote storages may be connected to a member user behavior monitoring device through a network. The above examples of the network include, but are not limited to, the internet, the intranet, the local area network, the mobile communications network, and the combination thereof.

For example, the input device 33 can receive input digital or character information, and generate key signal inputs related to user settings and function control of the display device. The output device 34 can include a display equipment such as a display screen.

For example, one or more modules or instructions are stored in the memory 32. When the instructions are executed by one or more processors 31, the electronic equipment performs the display method provided by any one of the embodiments of the present disclosure, such as the display method in any one of the above embodiments. The technical effects of the electronic equipment for performing the display method is the same as or similar to the technical effects of the display method in any one of the above embodiments of the present disclosure, and details are not described herein again.

At least an embodiment of the present disclosure further provides a non-transitory computer storage medium, the computer storage medium stores computer executable instructions, and the computer executable instructions can perform the display method provided by any one of the embodiments of the present disclosure. The technical effects of the non-transitory computer storage medium is the same as or similar to the technical effects of the display method in any one of the above embodiments of the present disclosure.

Finally, it should be noted that those skilled in the art can understand that all or part of the processes of implementing the display method in the above embodiments can be implemented by a computer program to instruct related hardware, and the program can be stored in one computer readable storage medium. The program, when executed, may perform the flow of the method in the embodiments described above. The storage medium may be a magnetic disk, a CD, a read-only memory (ROM), or a random access memory (RAM). The technical effects of the computer program is the same as or similar to the technical effects of the display method in any one of the above embodiments.

In addition, for example, the display device, the electronic equipment, and the like provided by the embodiments of the present disclosure may be various electronic terminal devices, such as a mobile phone, a personal digital assistant (PDA), a portable android device (PAD), a smart TV, etc., or may be a large terminal equipment, such as a server or the like. Therefore, the scope of protection of the present disclosure should not be limited to a particular type of device or equipment. The client described in the present disclosure may be applied to any one of the above electronic terminal devices in electronic hardware, computer software, or a combination of electronic hardware and computer software.

Furthermore, the display method provided by the present disclosure may further be implemented as a computer program executed by a CPU, and the computer program can be stored in the computer readable storage medium. When the computer program is executed by the CPU, the above functions defined in the display method of the present disclosure are performed.

Furthermore, steps of the method and system units described above may also be implemented by a controller and a computer readable storage medium for storing a computer program that allows the controller to implement the steps or unit functions described above.

In addition, it should be understood that the computer readable storage medium (e.g., a memory) described herein can be either the volatile memory or non-volatile memory, or can include both volatile memory and non-volatile memory. As an example and not a limitation, the non-volatile memory may include a read only memory (ROM), a programmable ROM (PROM), an erasable programmable ROM (EPROM), an electrically erasable programmable ROM (EEPROM), or a flash memory. The volatile memory can include a random access memory (RAM), and the random access memory can act as an external cache memory. As an example and not a limitation, the RAM can be obtained in various forms, such as a synchronous RAM (SRAM), a dynamic RAM (DRAM), a synchronous dynamic RAM (SDRAM), a double data rate SDRAM (DDR SDRAM), an enhanced SDRAM (ESDRAM), a synchronous link DRAM (SLDRAM), and a direct Rambus RAM (DRRAM). The storage equipment disclosed in the present disclosure are intended to include, but not limited to, these above memories and other suitable types of memory.

Those skilled in the art should understand that the various illustrative logical blocks, modules, circuits, and algorithm steps described in the present disclosure may be implemented as electronic hardware, computer software, or combinations of both. To clearly illustrate the interchangeability of hardware and software, functions of the various illustrative components, blocks, modules, circuits, and steps have been described. Whether the function is implemented as software or as hardware depends on the particular application and design constraints imposed on the overall system. Those skilled in the art can implement the described functions in various ways for each specific application, and the implementation should not be construed as out of the scope of the present disclosure.

The various exemplary logical blocks, modules, and circuits described in the present disclosure herein can be implemented or executed by the following components designed to perform the functions described herein. The components include: a general purpose processor, a digital signal processor (DSP), an application specific integrated circuit (ASIC), a field programmable gate array (FPGA), or other programmable logic component, discrete gate or transistor logic, discrete hardware components, or any combination of these components. The general purpose processor may be a microprocessor, alternatively, the processor may be any conventional processor, controller, microcontroller, or state machine. The processor may also be implemented as a combination of computing devices, e.g., a combination of a DSP and a microprocessor, a plurality of microprocessors, one or more microprocessors in combination with a DSP core, or any other such configurations.

The steps of a method or algorithm described in the present disclosure herein may be directly included in hardware, in a software module executed by a processor, or in a combination of both. The software module may be disposed in a RAM memory, a flash memory, a ROM memory, an EPROM memory, an EEPROM memory, a register, a hard disk, a removable disk, a CD-ROM, or any other form of storage medium known in the art. For example, the storage medium is coupled to the processor, so that the processor can read information from the storage medium or write information to the storage medium. In an alternative, the storage medium can be integrated with the processor. The processor and storage media can be disposed in the ASIC. The ASIC can be disposed in the user terminal. In an alternative, the processor and the storage medium may be disposed as discrete components in the user terminal.

In one or more exemplary designs, the functions may be implemented in hardware, software, firmware, or any combination thereof. If the functions are implemented in software, the functions may be stored in the computer readable medium or transmitted by the computer readable medium as one or more instructions or codes. The computer readable medium includes the computer storage medium and the communication medium, and the communication medium includes any medium that facilitates transfer of the computer program from one location to another. The storage medium may be any available medium that can be accessed by a general purpose or special purpose computer. As an example and not a limitation, the computer readable medium may include the RAM, ROM, EEPROM, CD-ROM, or other optical disk storage equipment, magnetic disk storage equipment, or other magnetic storage equipment. Alternatively, the computer readable medium may be any other medium that can be used for carrying or storing the required program codes in the form of instructions or the data structure and can be accessed by a general purpose or special purpose computer or a general purpose or special purpose processor. In addition, any connection can be properly referred to as a computer readable medium. For example, if the coaxial cable, fiber optic cable, twisted-pair wiring, digital subscriber line (DSL), or wireless technology such as infrared, radio, and microwave are used to transmit software from a website, server, or other remote source, the above-mentioned coaxial cable, fiber optic cable, twisted-pair wiring, DSL, or wireless technology such as infrared, radio, and microwave are all included in the definition of the medium. As used herein, a magnetic disk and an optical disk include a compact disk (CD), a laser disk, an optical disk, a digital versatile disk (DVD), a floppy disk, and a blue-ray disk, in which the magnetic disk generally reproduces data magnetically, and the optical disk reproduces data optically by using the laser. Combinations of the above should also be included within the scope of the computer readable medium.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. A display method, suitable for a display device, wherein the display device is configured to display in a first display mode and in a second display mode, and the display method comprises:
   obtaining user image information;
   determining whether a user is currently in a fatigue state based on the user image information; and
   switching the display device from the second display mode to the first display mode and allowing the display device to display in the first display mode if the user is currently in the fatigue state, wherein the first display mode is different from the second display mode,
   wherein subsequent to switching the display device from the second display mode to the first display mode and allowing the display device to display in the first display mode, the display method further comprises:
      performing visual processing on a display image in the first display mode; and
      allowing the display device to display a visually processed display image;
   performing visual processing on the display image in the first display mode comprises:
      blurring a background image in the display image to obtain a display image of which the background image is blurred;
   allowing the display device to display the visually processed display image comprises:
      allowing the display device to display the display image of which the background image is blurred; and
   blurring the background image in the display image comprises at least one of:
      uniformly blurring the background image, and
      progressively blurring the background image,
   wherein blurring the background image in the display image further comprises:
      extracting the background image from the display image;
   wherein extracting the background image from the display image comprises:
      extracting a foreground image from the display image by using a matting algorithm;
      constructing an image mask according to the foreground image;
      performing Gaussian filtering on the image mask to obtain an image mask with edge transition; and
      extracting the background image from the display image by using the image mask with edge transition.

2. A display method, suitable for a display device, wherein the display device is configured to display in a first display mode and in a second display mode, and the display method comprises:
   obtaining user image information;
   determining whether a user is currently in a fatigue state based on the user image information; and
   switching the display device from the second display mode to the first display mode and allowing the display device to display in the first display mode if the user is currently in the fatigue state, wherein the first display mode is different from the second display mode, wherein determining whether the user is currently in the fatigue state based on the user image information comprises:

calculating, based on the user image information, a blink frequency of the user in a predetermined time interval, a pupil distance of the user, and length of time when the user gazes at the display image; and determining whether the user is currently in the fatigue state based on the blink frequency of the user in the predetermined time interval, the pupil distance of the user, and the length of time when the user gazes at the display image.

3. The display method according to claim 2, further comprising:

switching the display device from the first display mode to the second display mode and allowing the display device to display in the second display mode if the user currently changes from the fatigue state to a non-fatigue state.

4. The display method according to claim 2, further comprising:

determining whether a current display mode of the display device is the second display mode;

wherein switching the display device from the second display mode to the first display mode and allowing the display device to display in the first display mode if the user is currently in the fatigue state comprises:

switching the display device from the second display mode to the first display mode and allowing the display device to display in the first display mode if the user is currently in the fatigue state and the current display mode is the second display mode.

5. The display method according to claim 2, wherein the first display mode is a two-dimensional display mode, and the second display mode is a three-dimensional display mode.

6. A display device, comprising an image sensor, a controller, and a display panel;

wherein the image sensor is on a side, facing a user, of the display device, and is configured to collect image data comprising user image information;

the controller is configured to extract the user image information from the image data, determine whether the user is currently in a fatigue state based on the user image information, and send a first display mode switching instruction to the display panel if the user is currently in the fatigue state; and the display panel is configured to display in a plurality of display modes, and the plurality of display modes comprise a first display mode, wherein the controller is configured to:

calculate, based on the user image information, a blink frequency of the user in a predetermined time interval, a pupil distance of the user, and length of time when the user gazes at the display device; and determine whether the user is currently in the fatigue state based on the blink frequency of the user in the predetermined time interval, the pupil distance of the user, and the length of time when the user gazes at the display device.

7. The display device according to claim 6, wherein the plurality of display modes further comprise a second display mode, and the second display mode is different from the first display mode; and the controller is further configured to send a second display mode switching instruction to the display panel if the user currently changes from the fatigue state to a non-fatigue state.

8. The display device according to claim 7, wherein the first display mode is a two-dimensional display mode, and the second display mode is a three-dimensional display mode; and the first display mode switching instruction is an instruction to switch the display device from the three-dimensional display mode to the two-dimensional display mode, and the second display mode switching instruction is an instruction to switch the display device from the two-dimensional display mode to the three-dimensional display mode.

9. An electronic equipment, comprising:

at least one processor, and a memory in communication connection to the at least one processor;

wherein the memory stores instructions executable by the at least one processor, and the instructions are executed by the at least one processor to allow the at least one processor to perform the display method according to claim 2.

10. The display method according to claim 2, wherein obtaining the user image information comprises:

collecting image data comprising the user image information; and extracting the user image information from the image data.

11. The display method according to claim 2, wherein subsequent to switching the display device from the second display mode to the first display mode and allowing the display device to display in the first display mode, the display method further comprises:

performing visual processing on a display image in the first display mode; and allowing the display device to display a visually processed display image.

12. The display method according to claim 11, wherein performing visual processing on the display image in the first display mode comprises:

blurring a background image in the display image to obtain a display image of which the background image is blurred; and allowing the display device to display the visually processed display image comprises:

allowing the display device to display the display image of which the background image is blurred.

13. The display method according to claim 12, wherein blurring the background image in the display image comprises at least one of:

uniformly blurring the background image, and progressively blurring the background image.

14. The display method according to claim 13, wherein blurring the background image in the display image further comprises:

extracting the background image from the display image;

wherein extracting the background image from the display image comprises:

extracting a foreground image from the display image by using a matting algorithm;

constructing an image mask according to the foreground image;

performing Gaussian filtering on the image mask to obtain an image mask with edge transition; and extracting the background image from the display image by using the image mask with edge transition.

15. The display method according to claim 13, wherein progressively blurring the background image comprises:
constructing a proportionality coefficient centering on a center point of the foreground image in the display image, calculating a diffusion coefficient according to the proportionality coefficient, and performing variable radius Gaussian blurring on the background image according to the diffusion coefficient,
wherein variation of the diffusion coefficient is that the further away from the center point of the foreground image in the display image, the greater the diffusion coefficient, the greater a blurring degree of the background image.

16. The display method according to claim 11, wherein performing visual processing on the display image in the first display mode comprises:
enhancing the foreground image in the display image.

17. The display method according to claim 16, wherein enhancing the foreground image in the display image comprises:
performing advancing color processing on the foreground image in the display image.

18. The display device according to claim 6, wherein the controller is configured to blur a background image in a display image in the first display mode to obtain a display image of which the background image is blurred; and
the display panel is configured to display the display image of which the background image is blurred.

19. The display device according to claim 6, wherein the controller is configured to enhance a foreground image in a display image in the first display mode to obtain a display image of which the foreground image is enhanced; and
the display panel is configured to display the display image of which the foreground image is enhanced.

* * * * *